(12) United States Patent
Hochstetler et al.

(10) Patent No.: US 10,788,035 B2
(45) Date of Patent: Sep. 29, 2020

(54) PUMP SLEEVE FOR A CHARGE AND SCAVENGE PUMP OF AN INTEGRATED DRIVE GENERATOR

(71) Applicant: HAMILTON SUNDSTRAND CORPORATION, Charlotte, NC (US)

(72) Inventors: Derek R. Hochstetler, Rockford, IL (US); Ted A. Martin, Byron, IL (US); Duane C. Johnson, Beloit, WI (US); Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 245 days.

(21) Appl. No.: 15/871,422

(22) Filed: Jan. 15, 2018

(65) Prior Publication Data
US 2019/0219050 A1    Jul. 18, 2019

(51) Int. Cl.
| | |
|---|---|
| *F04B 53/16* | (2006.01) |
| *F01C 21/10* | (2006.01) |
| *F02C 7/32* | (2006.01) |
| *F04B 41/06* | (2006.01) |
| *F04B 53/22* | (2006.01) |
| *F16H 47/04* | (2006.01) |

(52) U.S. Cl.
CPC .............. *F04B 53/16* (2013.01); *F01C 21/10* (2013.01); *F02C 7/32* (2013.01); *F04B 41/06* (2013.01); *F04B 53/22* (2013.01); *F16H 47/04* (2013.01); *F04C 2240/30* (2013.01); *F16H 2047/045* (2013.01)

(58) Field of Classification Search
CPC .................................. F04B 53/16; F04B 41/06
See application file for complete search history.

(56) References Cited

U.S. PATENT DOCUMENTS

| | | | | |
|---|---|---|---|---|
| 9,797,397 | B2* | 10/2017 | Wojcik | F04B 53/16 |
| 2016/0115950 | A1 | 4/2016 | Ikeda et al. | |
| 2017/0067367 | A1* | 3/2017 | Wojcik | F01D 25/20 |
| 2017/0067460 | A1* | 3/2017 | Wojcik | F04B 53/16 |
| 2017/0067461 | A1* | 3/2017 | Wojcik | F04C 2/344 |

OTHER PUBLICATIONS

European Search Report for EP Application No. 19151043.7 dated Mar. 21, 2019.

* cited by examiner

*Primary Examiner* — Derek D Knight
(74) *Attorney, Agent, or Firm* — Carlson, Gaskey & Olds, P.C.

(57) ABSTRACT

A pump sleeve for an integrated drive generator has a pump sleeve body extending between a first end and a second end. The first end is at a location adjacent a radially enlarged end plate. The body extends to the second end with a generally cylindrical body portion having an inner bore diameter defining a first distance. The body extends between the first and second ends for a second distance. A ratio of the first distance to the second distance is between 0.15 and 0.30. An integrated drive generator and a method are also disclosed.

7 Claims, 4 Drawing Sheets

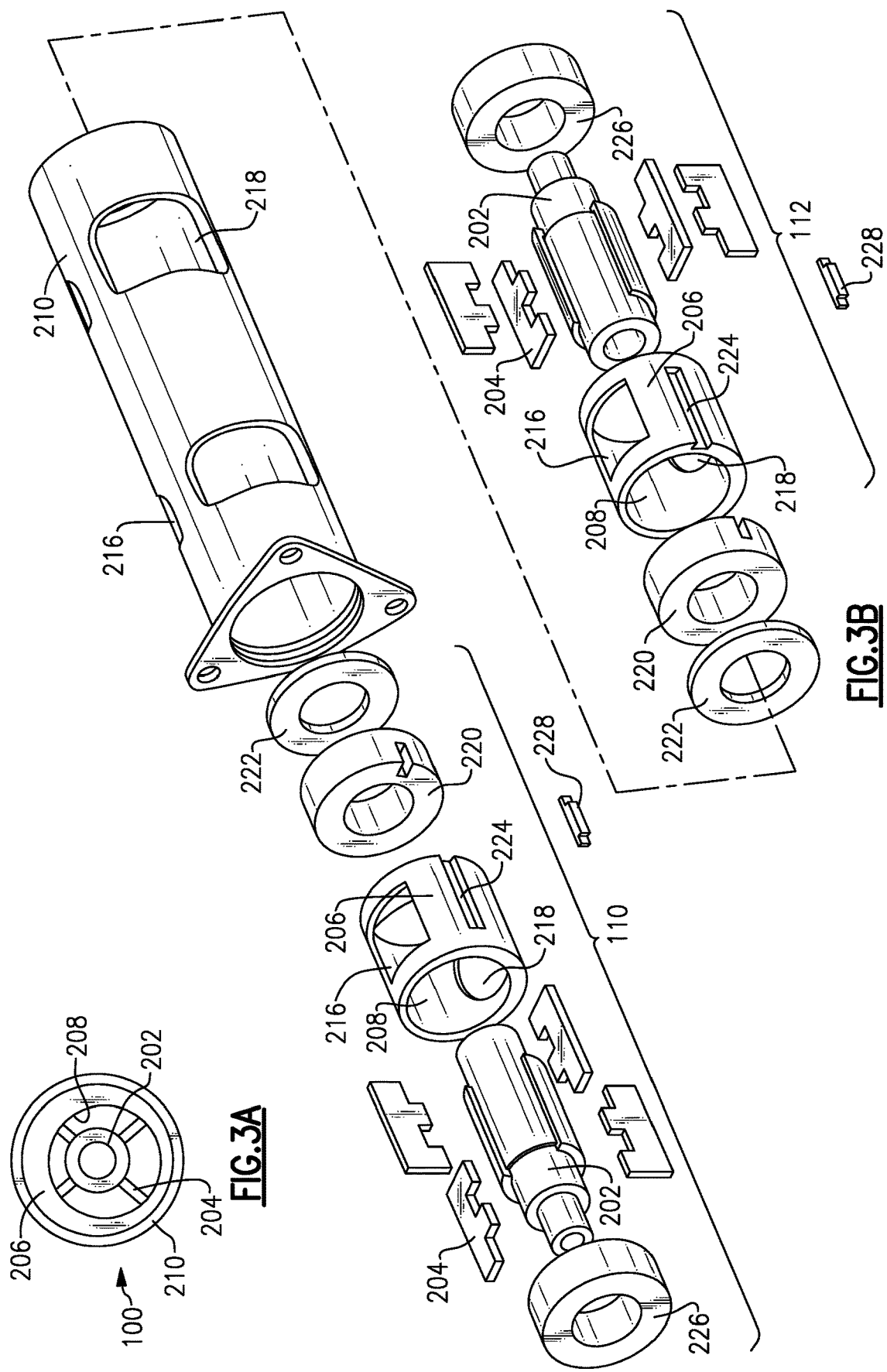

PUMP SLEEVE FOR A CHARGE AND SCAVENGE PUMP OF AN INTEGRATED DRIVE GENERATOR

BACKGROUND

This application relates to a pump sleeve for use in a combined charge and scavenge pump for an integrated drive generator.

Integrated drive generators are known and often utilized in aircraft. As known, a gas turbine engine on the aircraft provides a drive input into a generator input shaft. The generator typically includes a disconnect shaft that can transmit the input into a gear differential. The gear differential selectively drives a main generator to provide electric power for various uses on the aircraft.

It is desirable that the generated power be of a desired constant frequency. However, the speed from the input shaft will vary during operation of the gas turbine engine. This would result in variable frequency.

Integrated drive generators are provided with speed trimming hydraulic units. Gears associated with the differential and, in particular, a ring gear portion, provide rotation from the differential back into the trimming unit. A carrier also rotates another portion of the trimming unit. The trimming unit is operable to result in the output speed of the differential being effectively constant, such that electric power of a desirable frequency is generated.

The generator is mounted between two housing portions and a seal plate is mounted between the two housing portions.

In addition, various accessory systems, such as various pumps, are driven by differential output ring gear through an accessory drive gear.

One of the pumps is a charge pump and another is a scavenge pump. A single pump sleeve is utilized for both of these pumps and faces design challenges.

SUMMARY

A pump sleeve for an integrated drive generator has a pump sleeve body extending between a first end and a second end. The first end is at a location adjacent a radially enlarged end plate. The body extends to the second end with a generally cylindrical body portion having an inner bore of a diameter defining a first distance. The body extends between the first and second ends for a second distance. A ratio of the first distance to the second distance is between 0.15 and 0.30.

In addition, an integrated drive generator is disclosed as is a method of replacing a pump sleeve for use with both a charge and scavenge pump in an integrated drive generator.

These and other features may be best understood from the following drawings and specification.

BRIEF DESCRIPTION OF THE DRAWINGS

FIG. 3A shows details that will be true of both a charge and scavenge pump.
FIG. 3B is an exploded view of a charge and a scavenge pump.

DETAILED DESCRIPTION

Figure 1:
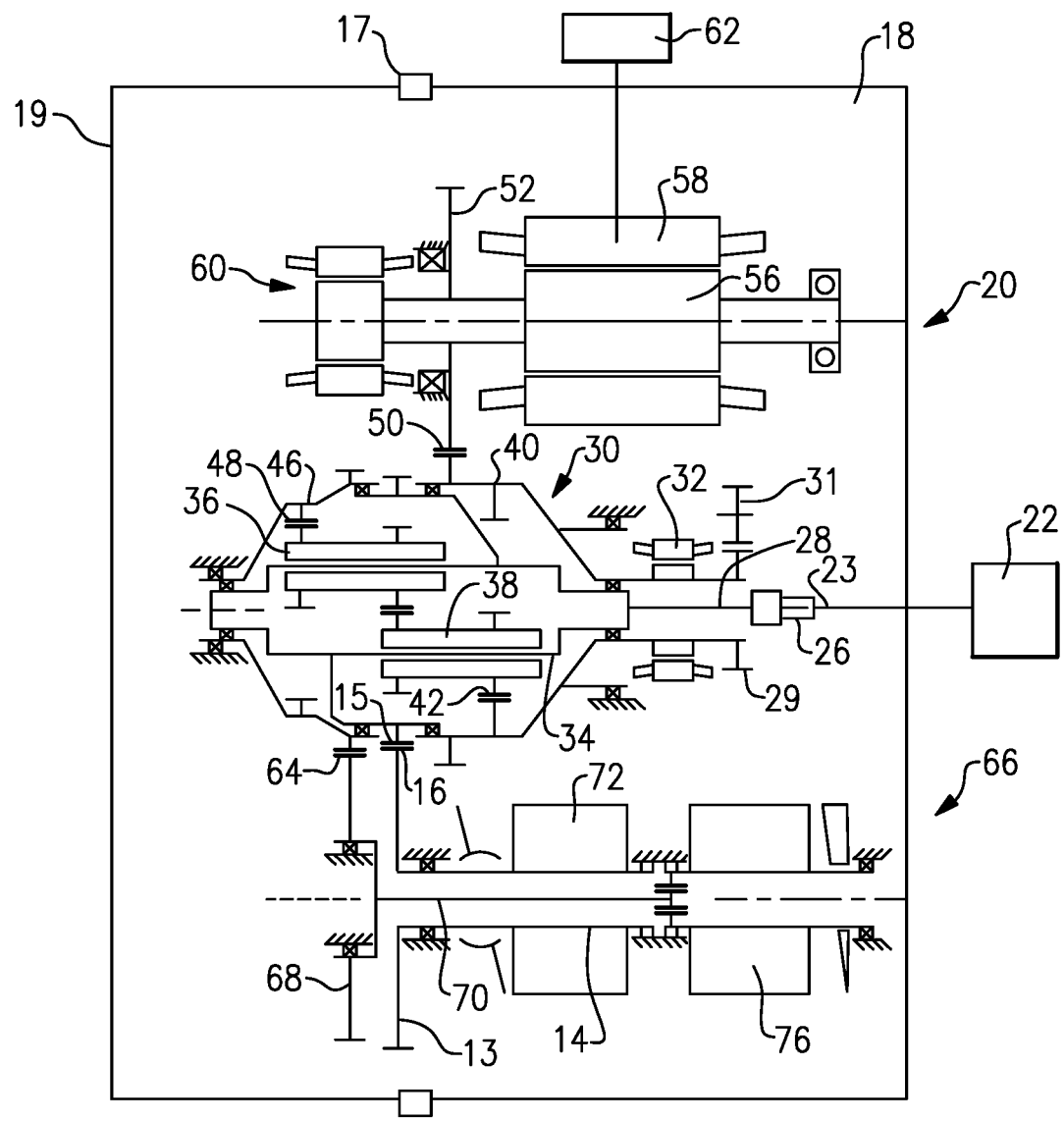
FIG. 1 schematically shows an integrated drive generator.

FIG. 1 shows an integrated drive generator 20. As shown, housing portions 18 and 19 surround the integrated drive generator and a seal plate 17 sits between the housing portions 18 and 19.

A gas turbine engine 22 may drive an input shaft 23 which selectively drives a disconnect assembly 26. The disconnect assembly 26, in turn, drives a carrier shaft 28, which drives a carrier in a gear differential 30.

As the carrier shaft 28 rotates, planet gears 36 and 38 are caused to rotate. Gears 38 have a gear interface 42 with a first ring gear portion 40. Gears 36 have a gear interface 48 with a second ring gear portion 46.

A gear 15 that is part of the carrier has a gear interface 16 with a gear 13 driving a shaft 14 also within the speed trimmer.

Ring gear portion 40 has a gear interface 50 with a main generator drive gear 52. When drive gear 52 is driven to rotate, it rotates a rotor 56 associated with a stator 58 of the main generator as well as an exciter rotor 60. Electric power is generated for a use 62, as known.

It is desirable that the frequency of the generated electric power be at a desired frequency. This requires the input speed to gear 52 to be relatively constant and at the desired speed. As such, the speed of the input shaft 23 is added to the speed of the speed trimmer 66 to result in a constant input speed to gear 52.

A gear 15 that is part of the carrier has a gear interface 16 with a gear 13 driving a shaft 14 also within the speed trimmer.

As known, the speed trimmer 66 includes a variable unit 72 and a fixed unit 76. The units 72 and 76 may each be provided with a plurality of pistons and a swash plate arrangement. If the input speed of the gear 13 is too high, the speed of the gear 52 will also be too high, and hence, the speed trimmer 66 acts to lower the speed of the trim gear 46 which will drop the speed of gear 52. On the other hand, if the input speed is too low, the speed trimmer will increase the trim gear speed and the speed seen by gear 52 will increase.

In essence, the variable unit 72 receives an input through gear 13 that is proportional to the speed of the input shaft 23. The variable unit 72 also receives a control input from a control monitoring the speed of the generator rotor 56. The position of the swash plate in the variable unit 72 is changed to in turn change the speed and direction of the fixed unit 76. The fixed unit 76 can change the speed, and direction of rotation of the shaft 70, and this then provides control back through the trim ring gear 46 to change the speed reaching the generator. In this manner, the speed trimmer 66 results in the frequency generated by the generator being closer to constant, and at the desired frequency.

A permanent magnet generator 32 rotates with the ring gear 40.

An accessory drive shaft 29 rotates with the ring gear 40 and drives a plurality of accessory gears 31.

The operation of the integrated drive generator 20 is generally as known in the art. A worker of ordinary skill would recognize that the desired frequency and speed at use 62 would dictate a number of design functions.

Figure 2:
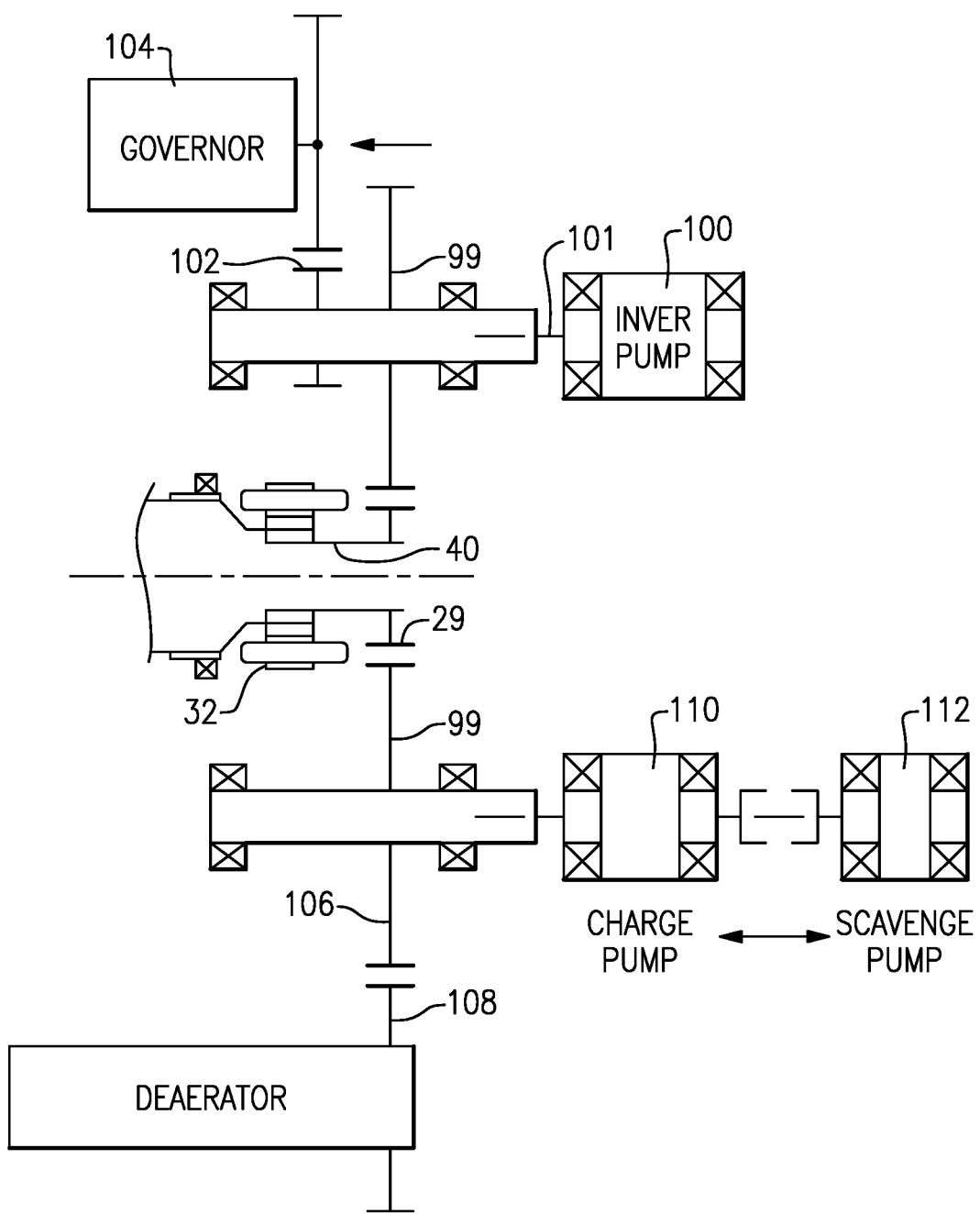
FIG. 2 shows an accessory gear drivetrain.

FIG. 2 shows the accessory drive gear 29. The accessory drive gear 29 drives a pair of driven gears 99. These driven gears were shown schematically as gear 31 in FIG. 1. One gear 99 drives a second gear 102 which, in turn, drives a governor 104. The gear 99 also drives an inversion pump 100 through a shaft 101. The second gear 99 drives a deaerator through gear 108, as well as a charge pump 110 and a scavenge pump 112.

The charge and scavenge pumps are illustrated in FIG. 3A. A pump shaft 202 for the charge pump is driven by gear 99 and carries a plurality of vanes 204. The vanes rotate within a cam sleeve 206 having an inner cam surface 208.

An outer pump sleeve 210 is illustrated. The scavenge pump 112 has each of the same components, however, a common sleeve 210 provides a pump sleeve for both of the pumps.

As shown in the exploded view of FIG. 3B, the pumps each include a pump shaft, vanes 204, cam sleeve 206, and a common sleeve 210. As can be seen the sleeve 210 has a pair of opposed windows 216 and 218 which provide inlet and outlet ports into the pumps. The cams sleeves 206 have mating windows 216 and 218. Bearings are positioned at each end of the cams.

Belleville spring washers 222, provides a bias force. As shown, the cam sleeves 206 include a keyway 224 and the sleeve 210 includes a mating keyway 240. The sleeve 210 includes mating keyways 240. Keys 228 lock the two together to prevent rotation.

Figure 4A:
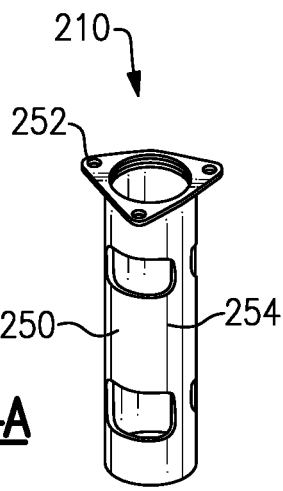
FIG. 4A is the first view of pump sleeve.

FIG. 4A shows the combined pump sleeve 210 having a body 250 with an enlarged end portion 252 and a cylindrical extending portion 254.

Figure 4B:
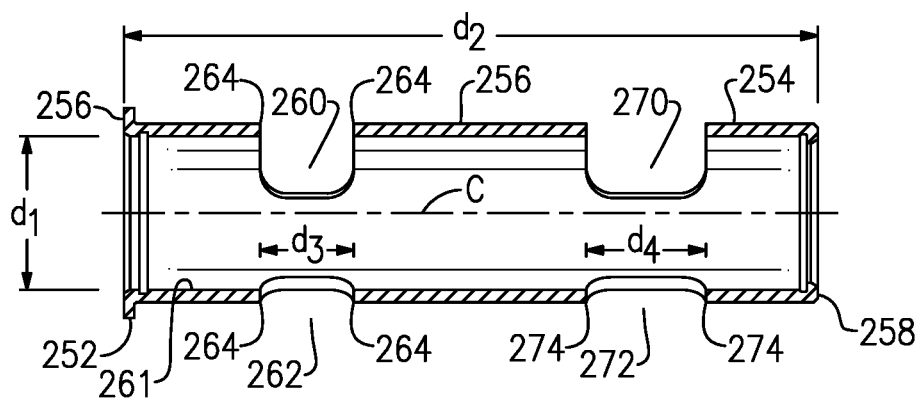
FIG. 4B is a second view.

As shown in FIG. 4B, the body 250 extends from an end 256 at the enlarged portion 252 and to a second 258. There are windows 260 and 262 to be associated with the charge pump, and other windows 270 and 272 associated with the scavenge pump. The windows provide inlet and outlet ports for the pump chambers.

An inner diameter of the hollow cylindrical portion 254 can be measured to an inner peripheral surface 261. The inner diameter is identified as $d_1$ in this drawing and in one embodiment was 1.375 inches (3.658 cm). A length $d_2$ between ends 256 and 258 and measured along a center axis C of the body 250 is shown as $d_2$. In one embodiment, $d_2$ was 6.119 inches (15.316 cm). The windows 260 and 262 extend between ends 264 for a third distance $d_3$. In one embodiment, $d_3$ was 0.832 inch (2.113 cm). The windows 270 and 272 extend between ends 274 for a distance $d_4$. In one embodiment, $d_4$ was 1.065 inches (2.705 cm). In embodiments, a ratio of $d_1$ to $d_2$ was between 0.15 and 0.30. The ratio of $d_3$ to $d_4$ was between 0.70 and 0.85.

Figure 4C:
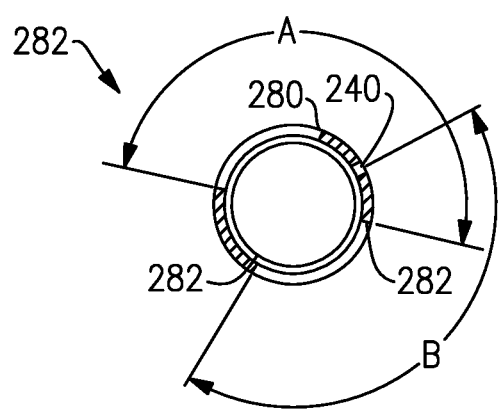
FIG. 4C is a third view.

As shown in FIG. 4C, the inlet windows extend between ends 282 across an angle B. In embodiments, the angle B is 109 degrees. In embodiments, angle B is between 99 and 119. An angle A is defined between circumferential ends 280 of the outlet windows. In embodiments, angle A was 100 degrees and in embodiments angle A is between 90 and 110 degrees. Stated broadly, angle A and angle B are different angles, and the angle B between the ends of the inlet window is smaller than the angle A between the ends of the outlet window.

A method of replacing a pump sleeve includes the steps of removing an existing combined pump sleeve from an integrated drive generator having an input shaft. A gear differential includes a carrier shaft to be driven by the input shaft, and a ring gear for driving a generator. The ring gear is also connected to drive at least charge and scavenge pumps through an intermediate gear, each of the charge and scavenge pumps including a driven shaft, a plurality of vanes, a cam sleeve and the existing combined outer pump sleeve. The existing combined pump sleeve is replaced with a replacement combined pump sleeve having a body extending between a first end and a second end, the first end being at a location adjacent a radially enlarged end plate, and the body extending to the second end with a generally cylindrical body portion having an inner bore with an inner diameter defining a first distance, and the body extending between the first and second ends for a second distance and a ratio of the first distance to the second distance being between 0.15 and 0.30.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A pump sleeve for an integrated drive generator comprising:
   a pump sleeve body extending between a first end and a second end, said first end being at a location adjacent a radially enlarged end pate, and said body extending to said second end with a generally cylindrical body portion having an inner bore with a diameter defining a first distance, and said body extending between said first and second ends for a second distance and a ratio of said first distance to said second distance being between 0.15 and 0.30;
   wherein said body having two pairs of circumferentially spaced windows to provide fluid ports to two distinct pumps, said windows to provide fluid ports to one of said pumps extending axially for a third distance and said windows to provide fluid ports to the second of said pumps extending axially for a fourth distance, and a ratio of said third distance to said fourth distance being between 0.70 and 0.85, wherein each of said pairs of window having an inlet port and an outlet port, and said inlet port extending circumferentially for a first angle that is between 99 and 119 degrees ad said outlet port extending for a second angle that is between 90 and 110 degrees; and
   wherein said first angle and said second angle are different angles.

2. The pump sleeve as set forth in claim 1, wherein the pumps include a charge pump and an scavenge pump.

3. The pump sleeve as set forth in claim 1, wherein said first angle is greater than said second angle.

4. The pump sleeve as set forth in claim 3, wherein said first angle is 109 degrees and said second angle is 100 degrees.

5. The pump sleeve as set forth in claim 4, wherein said first distance is 1.375 inches and said second distance is 6.119 inches.

6. The pump sleeve as set forth in claim 5, wherein said third distance is 0.832 inch and said fourth distance is 1.065 inches.

7. The pump sleeve as set forth in claim 1, wherein said first distance is 1.375 inches, said second distance is 6.119 inches, said third distance is 0.832 inch and said fourth distance is 1.065 inches.

* * * * *